Patented Jan. 9, 1945

2,367,108

UNITED STATES PATENT OFFICE 2,367,108

CASEIN COMPONENT OF WATER PAINTS

William H. Fales and William F. Fales, North Hempstead, N. Y.

No Drawing. Application March 20, 1943,
Serial No. 479,912

1 Claim. (Cl. 106—142)

This invention relates to water paints and relates more particularly to an improved and very stable casein solution to be used in the preparation of such water paints.

It is the general object of our invention to provide an improved casein solution as an essential component of water paints, characterized by increased stability, satisfactory and enduring viscosity, excellent keeping qualities, reduced casein content and unusual suspensive properties.

Our improved casein solution may be economically manufactured, has excellent adhesion and good elasticity, is free flowing under the brush, and does not set up too fast on the wall or other surface to which it is applied.

Our invention further relates to certain combinations of materials and to certain ordered procedure in manufacture, which will be hereinafter set forth and more particularly pointed out in the appended claim.

In the preferred manner of practicing our invention, we first prepare a known primary casein solution by adding water to commercial casein, commonly in the ratio of five to seven parts water to one of casein. We also provide a usual and suitable alkali, such as sodium carbonate, borax, tri-sodium phosphate or ammonia. This mixture is heated and agitated until the casein is completely dissolved or dispersed, after which any suitable preservative may be added.

Having prepared this known primary casein solution, we then add thereto an aqueous solution of intermingled non-acid derivatives of oleic, palmitic or linoleic acid and rosin, in the preferred ratio of one part by weight of the intermingled derivatives to from three to ten parts of dry casein.

The exact ratio depends upon the particular qualities desired in the final product. We have found in general that one part of the intermingled derivatives to three or four parts of dry casein will give good results under the more usual conditions.

A very satisfactory aqueous solution for the purposes above defined may be produced by intimately mixing commercial cottonseed oil or cottonseed fatty acids and rosin, and then treating the mixture with an alkaline hydroxide, such as caustic soda or potash or with a less basic substance, such as triethanolamine. Such treatment produces intermingled non-acid derivatives of the two initial products in the form of alkaline or neutral soaps.

By using the intermingled derivatives from these two different initial products (which separately produce diametrically opposite effects) as a means of viscosity control in a casein solution, we obtain quite unusual results. We can vary the viscosity of a casein solution without giving very much attention to the casein content present, and we can similarly vary the flexibility.

This is due to the fact that the alkaline or neutral derivatives of cottonseed oil or cottonseed fatty acids act to thicken a casein solution, while the corresponding rosin derivatives are thinners. By varying the ratio of one product to the other in the intermingled derivatives, we achieve an infallible method of viscosity control in our casein solutions.

We can obtain equal viscosities with casein solutions having as high as one part casein to five parts water, or as low as one part casein to eight parts water. Thus for a given viscosity we can widely vary the flexibility, and for a given flexibility we can widely vary the viscosity. This is of great value when these solutions are incorporated in a water paint.

Our improved casein solution as above described has been found to be very satisfactory in actual use as a component of water paints. Also, when used in conjunction with an oil emulsion, it has excellent suspensive properties.

In the specification and claim, the term "casein" is to be taken as including other suitable proteins. The term "non-acid derivative" is to be taken as including both alkaline and neutral salts. The term "cottonseed product" in the claim includes both cottonseed oil and cottonseed fatty acids.

Having thus described our invention and the advantages thereof, we do not wish to be limited to the details herein disclosed, otherwise than as set forth in the claim, but what we claim is:

A casein component for use in preparing water paints comprising the product which results from completely dissolving and dispersing a mixture of casein and a soluble alkali in water to form a primary casein solution, and thereafter combining said primary solution with an aqueous solution of saponified, water-soluble and intermingled non-acid derivatives of a cottonseed product and rosin, the proportion of said intermingled derivatives to dry casein by weight in said casein component being not substantially less than 1 to 10 and not substantially more than 1 to 3, and said casein component being characterized by satisfactory viscosity and stability in a wide range of concentrations, good flexibility control, and, when used in conjunction with oil emulsions, excellent suspensive properties.

WILLIAM H. FALES.
WILLIAM F. FALES.